United States Patent [19]

Laird

[11] 4,241,354
[45] Dec. 23, 1980

[54] APPARATUS FOR INDICATING UNAUTHORIZED DELIVERY OF A FLUID PRODUCT

[75] Inventor: Christopher B. Laird, Erie, Pa.

[73] Assignee: Geosource Inc., Houston, Tex.

[21] Appl. No.: 16,796

[22] Filed: Mar. 2, 1979

[51] Int. Cl.³ ............................................. G01D 5/02
[52] U.S. Cl. ...................................... 346/43; 222/30;
 346/61; 346/98
[58] Field of Search ........................ 346/61, 60, 59, 95,
 346/96, 98, 99, 43, 14 R, 14 MR, 36; 222/30;
 235/94

[56] References Cited

U.S. PATENT DOCUMENTS

| | | | |
|---|---|---|---|
| 1,967,677 | 7/1934 | McMullen | 346/98 X |
| 2,086,363 | 7/1937 | McMullen | 346/95 X |
| 3,139,027 | 6/1964 | Norman | 235/94 R X |
| 3,319,256 | 5/1967 | Valerio | 346/95 X |
| 3,329,312 | 7/1967 | Valerio | 222/30 |
| 3,366,967 | 1/1968 | Sherman | 346/43 |

Primary Examiner—Joseph W. Hartary
Attorney, Agent, or Firm—Arnold, White & Durkee

[57] ABSTRACT

Apparatus for indicating unauthorized delivery of liquid product for use in connection with a Veeder-Root Counter-Printer is characterized by a timer arrangement adapted to measure the time duration of an interruption in liquid product flow and to prime the printer's sale sequence number for incrementation if the duration of the interruption exceeds a predetermined time interval. If flow is resumed before the same ticket is removed from the printer, a nonsequential sale sequence number is imprinted on the ticket when it is removed, thereby providing an indicia that flow has been interrupted for at least the predetermined interval.

12 Claims, 7 Drawing Figures

APPARATUS FOR INDICATING UNAUTHORIZED DELIVERY OF A FLUID PRODUCT

BACKGROUND OF THE INVENTION

1. Field of the Invention

This invention relates to liquid distributing equipment, and, in particular, to an apparatus operable in association with a ticket marking device to indicate improper or unauthorized delivery of liquid products.

2. Description of the Prior Art

It is common practice to transport liquid products, and particularly liquid petroleum product such as fuel oil and gasoline, in large tank delivery trucks. The sight of such large petroleum delivery trucks dispensing allotments of gasoline at the neighborhood service stations and fuel oil to individual homeowners is commonplace.

In the typical instance, the party to whom the liquid petroleum product is dispensed receives an itemized "ticket" recording the transaction. The ticket typically contains identification of the purchaser, a sale number or other indication identifying the previous transaction, a sale number indicating the end of the dispensation of the liquid product to the consumer in question, and an indication of both the initial and the final gallonage of that dispersion. The number of gallons dispensed to the given consumer is, of course, determined by the difference between initial gallonage and final gallonage.

A well-known device for providing such transaction information on a ticket for an individual consumer is the Veeder-Root Counter-Printer Assembly. This device includes a number of discs having alpha-numeric characters in relief thereon mounted on a shaft geared to the liquid meter on the truck. Appropriate ones of the discs are advanced (much like an automobile odometer) as the volume of liquid is dispensed from the truck to the consumer. Other discs are provided whereby the identifying criteria, such as the sale number assigned to a given consumer, may be displayed on the ticket. The purpose of the sale sequence number is to insure that each dispensation of product has been recorded.

At the beginning of a transaction to a given customer the truck driver inserts a transaction ticket for that particular consumer into a ticket tray and cranks the ticket into the counter-printer assembly. The sale number assigned to the given customer and the initial gallonage (typically zero) are imprinted on the ticket by the action of a rubber hammer bringing the surface of the ticket into contact with the appropriate ones of the relieved figures on the discs. At the end of the transaction, the rubberized hammer prints the final gallonage on the ticket by again bringing the ticket into contact with the appropriate gallonage figures on the discs. In this manner, in the typical case, the transaction between the delivery truck operator and the consumer is memorialized.

When the final gallonage is imprinted on the ticket, the counter-printer primes the sale number indexing mechanism to provide some measure of security against unauthorized delivery. For example, if the driver dispenses liquid product at an unauthorized location without a ticket being entered into the counter-printer, the counter-printer will increment the sale number and prime the indexing mechanism. Thus, when the driver next dispenses liquid product, a sale number not sequential with respect to the last authorized sale number will be printed. This discourages attempts to deliver liquid product without a ticket in the counter-printer.

There has, however, developed an illegal practice known as "riding the ticket". Although there are probably numerous variations on the theme, the basic tactic involved when "riding the ticket" is substantially as follows. A delivery operator before making a delivery will, prior to arrival at the location of the authorized delivery, move the truck to a site at which an illegal dispensation of liquid product is to occur. The operator will crank into the counter-printer a ticket intended for ultimate transmission to the authorized customer. If it is assumed that the authorized customer has ordered 250 gallons of liquid product, the operator will dispense some gallonage less than that figure at the illegal dispensation site. For example, 175 gallons may be dispensed at the illegal location.

The delivery truck operator then moves the truck to the authorized consumer, leaving in the counter-printer assembly the ticket inserted at the unauthorized drop. Thus, the driver has "ridden the ticket" from the illegal drop to the site of the authorized customer drop.

At the authorized location the driver, relying on the negligence or inattentiveness of the customer, will deliver the balance of the authorized gallonage (in this example, 75 gallons). When the balance of the delivery has been completed the driver merely cranks out the ticket. This ticket ostensibly indicates that the authorized customer has received his full allotment of petroleum product. The authorized customer will be billed accordingly. In reality, however, the authorized customer has received only a portion of the ordered gallonage. The remainder has been illegally dropped. "Riding the ticket" is thus characterized by the sequential occurrence of the following events: insertion of a ticket; liquid flow; interruption in flow for a period in which the ticket is ridden; resumption of flow; and removal of ticket.

The advantage to be derived by an apparatus which inhibits or renders impossible the practice of "riding the ticket" is readily apparent.

Attempts have been made in the prior art to monitor interruptions in liquid delivery. For example, apparatus for recording liquid delivery data is believed to have been offered for sale by Flo Time Ticket Printer, Inc., Baltimore, Md. Such a device is believed to be the device disclosed in U.S. Pat. No. 3,366,967 (Sherman et al.). This device provides an electrically operable apparatus for recording liquid delivery data which specifies the time of commencement of delivery, the time of termination of delivery, and a mechanism to preclude removal of the data record prior to completion of the delivery and for a specified period after the termination of the delivery. It is also believed that the time an interruption in liquid flow occurs is also recorded. However, any flow interruption, of any time duration and for any reason, is recorded. If, for example, the driver briefly paused during an authorized delivery, the flow interruption necessitated thereby is recorded.

Other devices, such as that available from Arkstrom Industries, Newark, N.J., automatically print the ticket when flow stops. This device, believed to exemplify the devices shown in U.S. Pat. Nos. 3,319,256 and 3,329,312 (both to da Silva Valerio), appears to require external connection to the delivery vehicle's electrical system in order to provide the electrical current for electrical actuation thereof. To require an electrical connection in any monitoring device is believed to be disadvantageous due to the requirement of an expensive explosion prevention arrangement necessary when volatile liquids, as petroluem products for example, are dispensed.

A device sold by Brooks Instrument Division of Emerson Electric Company, Statesboro, Ga., known as the "Transaction Computer" is believed to also require interconnection to the vehicle's electrical system.

Other devices have been used which interlock with the vehicle's ignition or brake system whereby the ignition or the brake is locked when a ticket is inserted into the device. These vehicle's systems are releasable only when the ticket is removed. Devices such as these are also believed to be disadvantageous from a safety standpoint since in the event of a emergency occurrence it may not be possible to be able to remove the ticket from the device. Thus, the delivery vehicle, with its volatile cargo, may remain in the vicinity of a fire or explosion. The potential for a catastrophic result is apparent.

It is believed to be advantageous, in view of the foregoing, to discourage or inhibit "riding the ticket" by providing any suitable indicia on the transaction ticket if liquid product flow is interrupted for a significant predetermined time interval. In this manner an indicia is printed on the ticket which represents the occurrence of both a flow interuption of a duration greater than a predetermined reference time interval followed by the resumption of flow before the ticket is removed. These events, it will be recalled, are the hallmarks of "riding the ticket."

Apparatus in accordance with this invention may be operable in association with a Veeder-Root Counter-Printer assembly and a liquid meter to provide an indication in the form of a non-sequential sale number on the transaction ticket representative of the occurrence of an interruption in the flow of liquid product from the truck for a time duration in excess of a reference time interval followed by flow resumption. If an indicia were provided on the transaction ticket which would indicate that an interruption in flow for a given time duration followed by flow resumption has occurred, the operator would then be called upon to explain the origin of the interruption.

It is believed to be of further advantage to provide a monitoring device which is "self-contained" in the sense that it is independent of other vehicle subsystems and responsive only to the liquid flow.

Further, it is believed to be of advantage to provide a monitoring device which does not require external interconnection with the vehicle's ignition, brake or other subsystems. Such external connections usually invite tampering. However, with the elements of the monitoring device disposed within the casing of the counter-printer, tampering is discouraged. Furthermore, the interconnection of a monitoring apparatus in the counter-printer casing may be effected by the fleet operator without the driver's knowledge, if it is desired to check on the delivery practices of a particular driver without arousing his suspicion.

SUMMARY OF THE INVENTION

In accordance with this invention an apparatus for monitoring the flow of the liquid product from a tank or reservoir provides an indicia on the transaction ticket representative of the occurrence of both an interruption of a predetermined time duration in the flow of liquid from the tank truck reservoir followed by flow resumption before the transaction ticket is removed. The apparatus includes a timer operatively associated with a printer whereby the time duration of a flow interruption is measured and the printer actuated if the interruption exceeds a predetermined time interval and the interruption is followed by a resumption of flow prior to the removal of the ticket.

In the preferred embodiment of the invention, the flow monitoring device is operable with a Veeder-Root Counter-Printer and the timer takes the form of a fluidic piston-cylinder arrangement which has a linkage connected thereto. The timer is operable to prime the sale sequence number indexing arrangement in the Veeder-Root Counter-Printer if the duration of the interruption to liquid flow exceeds a predetermined time interval. The piston is moveable within the cylinder in response to the introduction and accumulation of a biasing fluid, such as air, to thereby arm a hammer connected to the linkage. As long as liquid flow continues, a pump operatively associated with the liquid flow meter introduces biasing fluid into the cylinder to maintain the hammer at the primed position. If an interruption in flow occurs, the pump action is terminated and the accumulated biasing fluid within the cylinder begins to leak therefrom. A biasing force imposed on the piston by a biasing element, such as a spring, displaces the piston within the cylinder to trip the hammer and to thereby release a latch associated with the sale number indexing arrangement. When flow resumes after the timer (piston-cylinder) times out, the sale sequence number is incremented. However, if flow resumes before the timer times out, the resumption of flow restarts the pump, reprimes the hammer, and continued delivery will occur without releasing the indexing latch. At the cessation of flow at the normal end of delivery, the ticket is printed in the normal operative mode of the Veeder-Root Counter-Printer Assembly.

In this manner an indicia is provided that both (1) a flow interruption in excess of a predetermined time interval and (2) a flow resumption thereafter have occurred before the ticket was removed from the printer. Thus, an indicia of two of the necessary events which characterize "riding the ticket" is provided on the record of the transaction.

BRIEF DESCRIPTION OF THE DRAWINGS

The invention will be more fully understood from the following detailed description thereof, taken in connection with the accompanying drawings, which form a part of this invention and in which.

DESCRIPTION OF THE PREFERRED EMBODIMENT

Figure 1A:
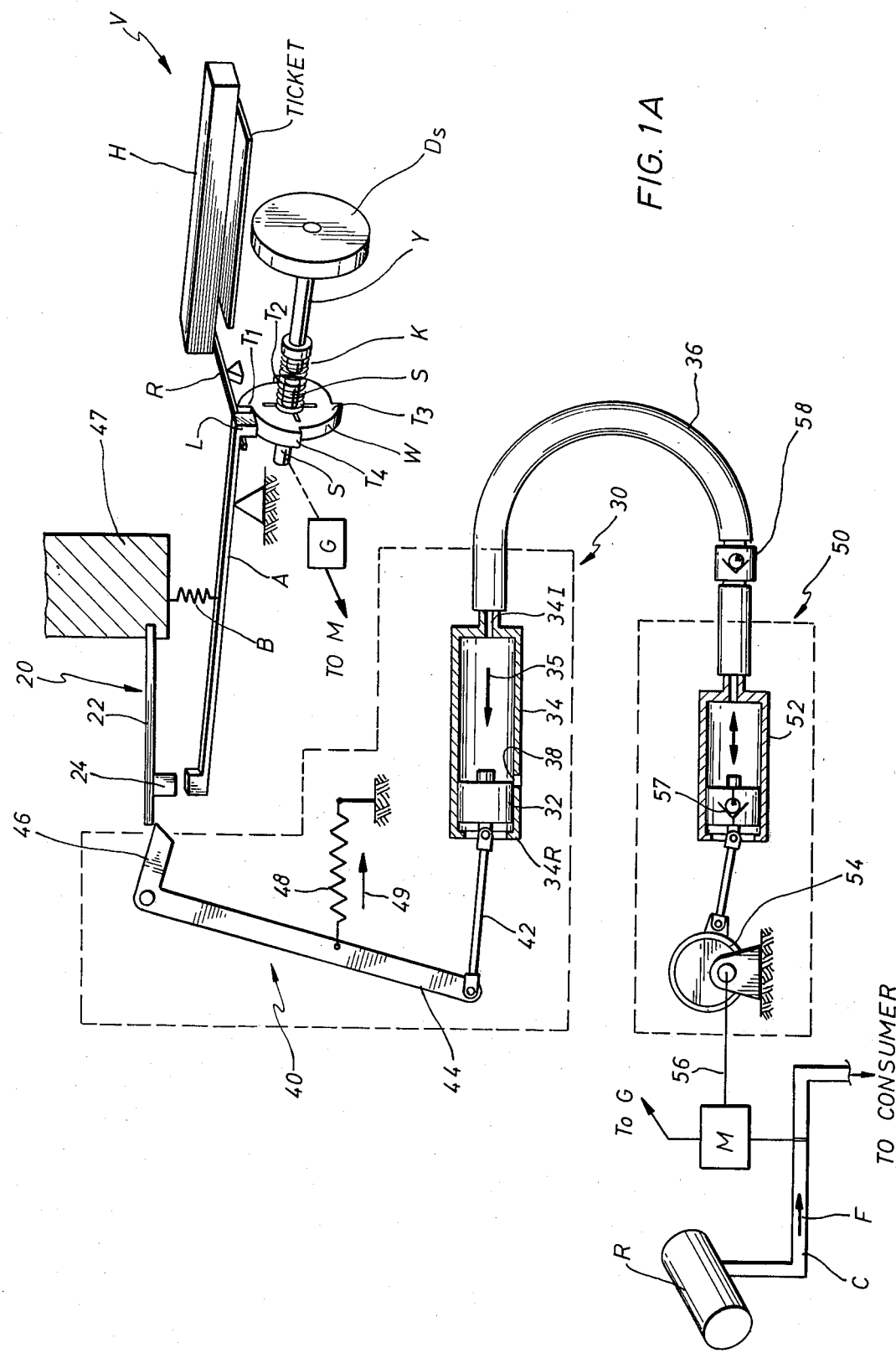
FIGS. 1A, 1B, and 1C represent a highly stylized schematic illustration of an apparatus embodying the teachings of this invention interconnected with a Veeder-Root Counter-Printer and schematically show the various positions occupied by elements of the invention during the operation thereof.

Throughout the following description similar reference numerals refer to similar elements in all figures of the drawings.

Figure 1B:
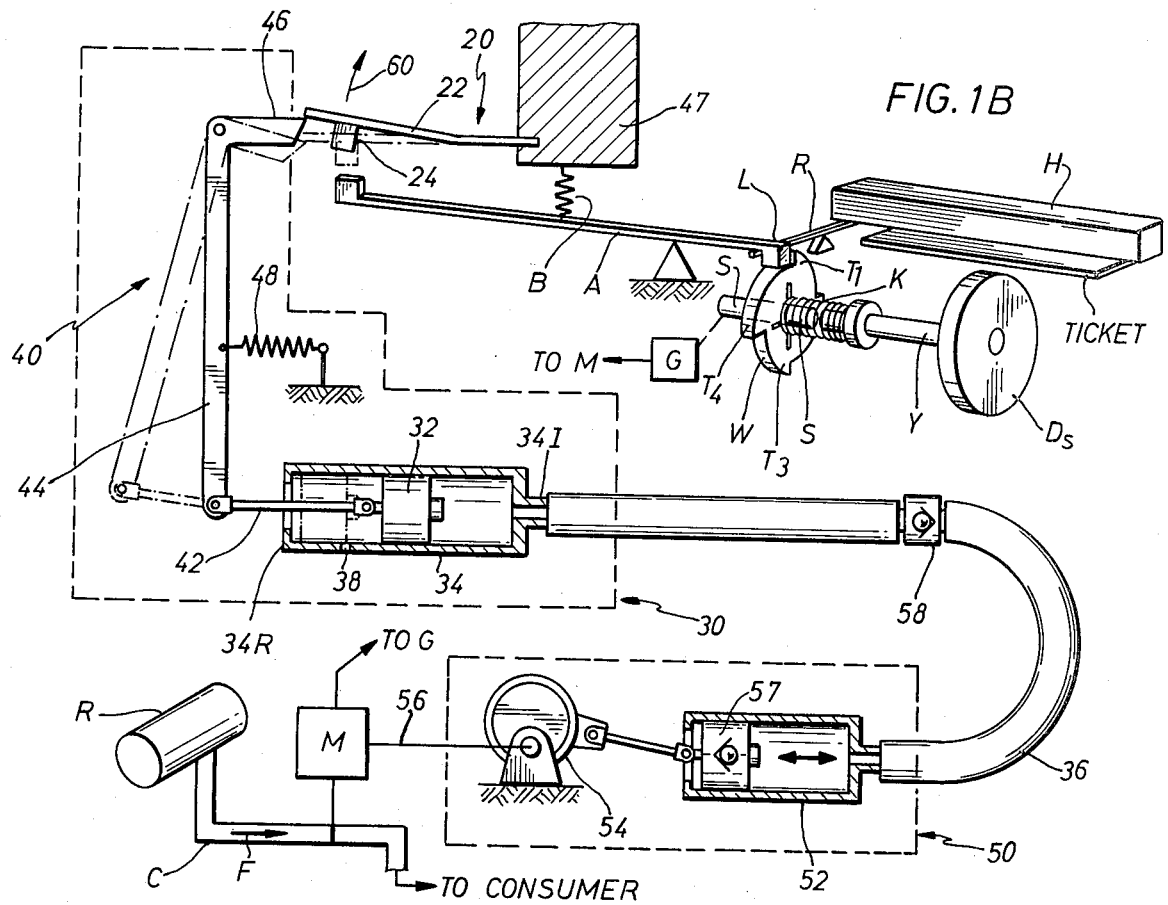
Figure 1C:
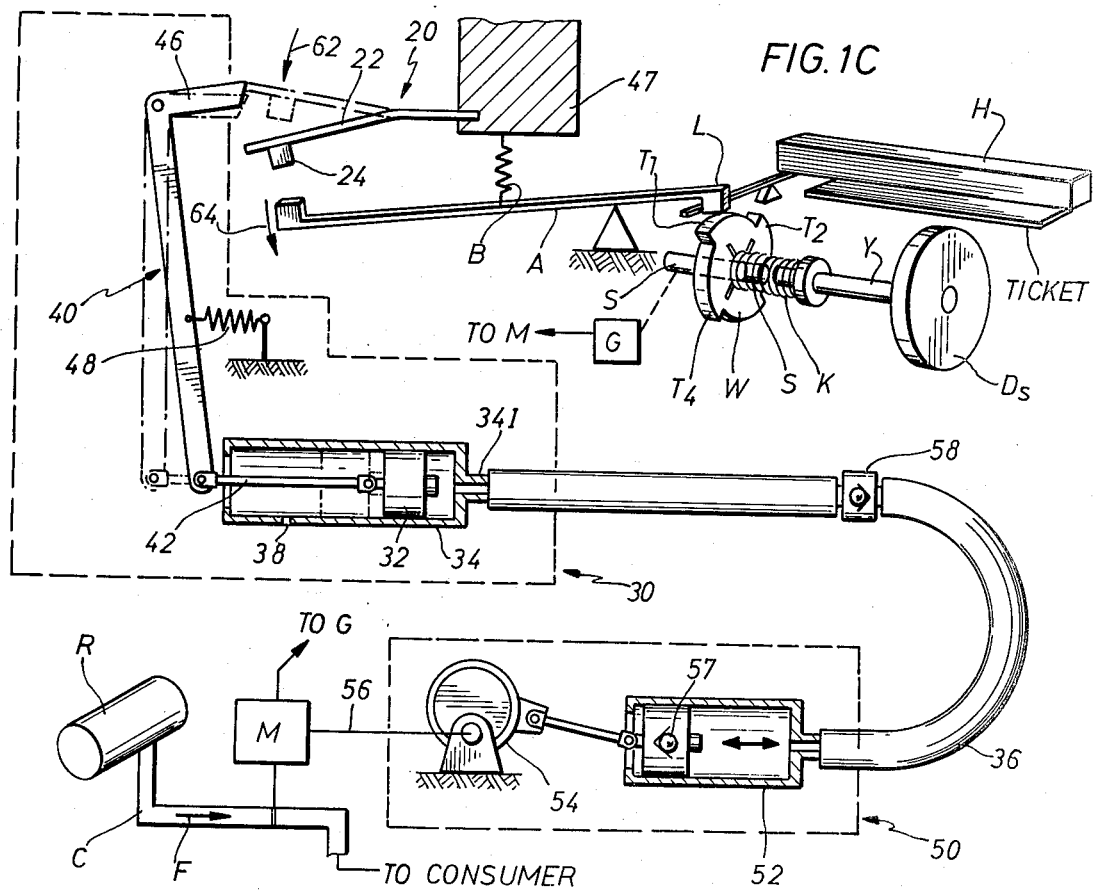

With reference to FIG. 1, shown in a highly stylized pictorial representation of an apparatus for monitoring the flow of a liquid in accordance with this invention and the interconnection thereof with a Veeder-Root Counter-Printer apparatus. FIGS. 1A, 1B and 1C, respectively, illustrate the apparatus during various phases of its operation to thereby schematically illustrate the principles and mode of operation of an apparatus in accordance with this invention.

With reference to FIG. 1, an apparatus generally indicated by reference 10 for monitoring the flow of liquid, as a liquid petroleum product, from a reservoir R to a receiving consumer is illustrated. The purpose of the apparatus 10 in accordance with the invention is to provide an indication on a ticket if an interruption in the flow F of liquid within a conduit C is of a time duration which exceeds the predetermined time interval and is followed by flow resumption before the ticket is removed from the Veeder-Root Counter-Printer. Although the invention is hereinafter described in the context of a liquid product flow, as a petroleum product, it is to be understood that the apparatus in accordance with this invention is able to be utilized in connection with the dispensation of any flowable fluid product, either a liquid or a gas, which is capable of metering and which is recorded by a Veeder-Root Counter-Printer V. FIG. 3 illustrates the apparatus in association with a generalized printer assembly.

The Veeder-Root Counter-Printer V with which the monitoring arrangement 10 of the instant arrangement is associated includes a printer having a rubberized hammer H adapted for movement therein. The hammer H, when actuated, strikes against a ticket inserted into the printer to forcefully bring the ticket into contact with an array of discs D (only one disc, $D_S$, being shown in FIG. 1) so that the gallonage and sale sequence number of a transaction may be imprinted thereon.

The sale sequence disc $D_s$ is connectable into and out of a driven relationship with a sequence wheel W by a wire clutch K and connector arrangement K (as a geneva movement). The sequence wheel W is mounted for rotational movement with respect to a shaft S and controls one end of wire clutch K. The shaft S is connected through a gear arrangement G with a flow meter M, the connection being schematically indicated in FIG. 1. The meter M is disposed in a flow measuring arrangement with the flow F of liquid in the conduit C.

The sequence wheel W when allowed to rotate through its geared interconnection with the meter M will respond to the passage of flow through the meter by rotating about the shaft S. A rotational force is also transmitted through the clutch K to the disc $D_s$ to sequentially increment the sale sequence number in a manner discussed in detail herein.

The sequence wheel W has a predetermined number of tangs T disposed thereon. In FIG. 1, the sequence wheel W has four tangs $T_1$ through $T_4$ disposed ninety degrees from each other. The tangs $T_1$ through $T_4$ are sequentially engageable by a latch, or detent, L disposed on the end of a pivotally mounted arm A. The arm A is biased to the position shown in FIG. 1A by a bias element B, as a spring, into engagement with one of the tangs $T_1$. The arm A is also connected to the printer V through a suitable mechanical linkage rod R.

The Veeder-Root Counter-Printer V, the conventional and well-known elements of which are described above, operates as follows during a normal transaction sequence. At the termination of a given transaction, the printer hammer H drives the ticket into contact with the discs D, including the disc $D_s$, to thereby imprint the sale sequence number and final gallonage on that ticket. For discussion purposes, let it be assumed that the sale sequence number for the given transaction is "6". That ticket is provided to the customer.

When the printer hammer H imprints that ticket, the action of the hammer H is transmitted through the linkage rod R and applies a pivoting force to the arm A. The arm A responds by pivoting (upwardly in FIG. 1A) to lift the latch L from its engagement with the tang $T_1$ engaged by the latch during the given transaction. The sequence wheel W, momentarily released from its latched engagement, rotates slightly beneath the latch arm A (in response to a bias imposed by the wire clutch K) and thereby engages the shaft S to the connector arrangement Y. When the arm A is reseated (by the action of biasing element B), the latch L falls intermediate the tang $T_1$ and the tang $T_2$ (the portion of the latch L as seen in FIG. 1C). The sequence wheel W is thus primed to increment the sale sequence number.

At the next transaction, the next customer's ticket is inserted into the Veeder-Root Counter-Printer V. The hammer H is actuated and the previous sale sequence number (here, a "6") and the initial gallonage (either the ending gallonage from the previous transaction or a zero) is imprinted on the ticket. Note that the action of the hammer H again pivots the arm A through the connection R to move the latch L away from its latching position. However, since the bias imposed on the wheel W has been exhausted (by the action of the hammer at the termination of the previous transaction), the lifting of the latch L is a "phantom" gesture, since this pivotal movement and return of the latch L results in no further movement of the sequence wheel W. The sale sequence number remains at its previous value, a "6".

When flow begins during the present transaction, the meter movement is imparted to the wheel W through the geared interconnection G with the meter M. The wheel W is free to rotate the remaining angular distance until the tang $T_2$ is engaged by the latch L. The rotational movement of the meter M is transmitted by the shaft S to the connector arrangement Y through the clutch K, thereby rotating the disc $D_s$ to present the next sequence number (a "7") to the printer. The wheel W rotates with the shaft S until the tang $T_2$ is engaged by the latch $L_2$ then releasing the wire clutch K to disengage the shaft S from the connector Y.

At the termination of the transaction, printing the ticket out displaces the ticket slightly (to prevent double printing on the same line of the ticket) and the hammer H imprints the appropriate sale sequence number (a "7") and the ending gallonage on the ticket. The customer is billed in accordance with the difference between the initial and final gallonages.

The action of the hammer H in imprinting the final gallonage and the sale sequence number (the "7") on the ticket has again lifted the arm A through the rod R. The wheel W slightly rotates to move the tang $T_2$ out of a portion engageable by the latch L when the latch L reseats. The sale sequence number disc $D_s$ is thus again primed for incrementation at the resumption of liquid flow.

The Veeder-Root Counter-Printer V is operable in conjunction with the monitoring arrangement 10 of the instant invention to provide an indicia, in the form of a non-sequential sale sequence number, if the flow F in the conduit C is interrupted for a period of time greater than a reference time interval and if flow F is thereafter resumed before the ticket is removed. It can be appreciated that the reference time interval may be selected to last for a duration such that any attempt to "ride the ticket" will require a time period greater than the reference time interval. Thus, that practice may be effectively inhibited or rendered impossible by the apparatus of the instant invention.

In accordance with this invention the monitoring arrangement generally indicated by reference numeral 10 is disposed in cooperative association with the Veeder-Root Counter-Printer V. The monitoring arrangement 10 includes an actuator generally indicated by reference numeral 20 and a timer indicated by reference character 30 operatively connected therewith. Actuator 20 is operable to prime the sale sequence disc $D_s$ if an interruption in the liquid flow F through the conduit C exceeds a predetermined time interval. The timer 30 is responsive to the flow of liquid F and is operative to time the duration of an interruption thereof.

A timer initiating signal generating arrangement 50 is operatively associated with the timer 30 and with the flow meter M for transmitting a timer initiating signal to the timer 30 upon the occurrence of an interruption in liquid flow F.

As shown in FIG. 1, the reservoir R may typically take the form of a liquid petroleum storage tank disposed on a delivery vehicle. Conduit C is typically the outlet hose of the tank truck which terminates in a suitable flow control nozzle (not shown). The flow control nozzle is adapted for insertion into the customer's liquid receptacle in a manner readily appreciated by those skilled in the art.

In the highly stylized representation of the invention shown in FIG. 1, the actuator 20 includes a resilient spring arm 22 connected at one end thereof to a fixed standard 47, as a portion of the Veeder-Root housing. The opposite end of spring arm 22 has a spring hammer 24 disposed thereon. The spring hammer 24 is operative to engage the end of the arm A opposite the latch L to thereby prime the scale sequence disc $D_s$ for advancement thereof if flow is reinitiated with the same ticket in the printer V after the timer 30 has timed out.

The timer 30 is responsive to the liquid flow F within the conduit C in a manner made more clear herein and serves to time the duration of an interruption in the liquid flow F. The timer 30 initiates the actuator 20 if the interruption in flow exceeds the predetermined time interval.

The timer 30 includes a fluidic piston 32 movable within a cylinder 34 in response to the introduction of a biasing fluid through a conduit or hose 36 from a first position (generally indicated in FIG. 1C) to a second position shown in FIG. 1A. The cylinder 34 has an inlet port 34I disposed in fluid communication with the hose 36 and has also provided retaining flanges 34R at the opposite end thereof. A vent opening 38 is disposed through the cylinder 34 at a predetermined position in the cylinder for a purpose discussed herein.

A linkage 40 is connected to the piston 32 and is adapted to initiate the actuator in a manner to be discussed. The linkage 40 includes an arm 42 pivotally connected at one end to the piston 32 and at the other end to a spring hammer sear 44. The spring hammer sear 44 is itself pivotally connected at its opposite end to a fixed standard. A sear finger 46 is provided on the sear 44. A biasing element 48, shown in FIG. 1 as a coil spring, is connected in a manner so as to impose a biasing force acting in the direction 49 which tends to displace the piston 32 within the cylinder 34 from the second position (FIG. 1A) to the first position (FIG. 1C) through the intermediate position (shown in FIG. 1B) when the introduction of biasing fluid into the cylinder 34 is interrupted. The biasing element 48 is operative to move the linkage 40 into contact with the actuator 20 at the termination of the predetermined time interval. The biasing element 48 is shown in FIG. 1 as interconnected between a fixed standard and a portion of the spring hammer sear 44, although any suitable location whereby the biasing element may perform its function lies within the contemplation of this invention.

The timer initiating signal generating means 50 includes a reciprocating pump 52 connected to the hose 36 and responsive to motive forces imparted thereto from a pump actuator 54. The pump actuator 54 is driven by the meter M through a meter linkage 56 eccentrically connected to the pump actuator 54. Of course, the timer 30 may be made responsive to the flow F in any manner, the interconnection with the meter M being believed the most convenient manner of so doing. In the arrangement shown, check valves 57 and 58 are required. Of course, since any arrangement chosen to make the timer 30 responsive to the flow F may be used, the valves may or may not be required.

In operation, when it is desired to deliver a quantity of liquid product to the consumer, the ticket is inserted into the Veeder-Root Counter-Printer V. The previous sale sequence number and initial gallonage is printed on the ticket as discussed above. The initiation of flow increments the sale sequence number, typically by one digit, as discussed above. At the beginning of a delivery the piston 32 is disposed substantially adjacent the inlet end 34I of the cylinder and the spring arm 22 occupies a rest position substantially similar to the position in which it is shown in FIG. 1C. As liquid flows in the conduit C the meter begins operation and drives the pump actuator 54 through the meter linkage 56. After a predetermined short time after flow is initiated the reciprocating pump 52 has introduced a predetermined volume of biasing fluid, such as air, into the cylinder 34 to thereby displace the piston 32 from the first position toward the second, arming, position shown in FIG. 1A. The accumulated fluid within the cylinder imposes a biasing force acting in the direction 35 on the piston 32. The biasing force is generated by the introduction and accumulation of pressurized biasing fluid within the cylinder 34. Displacement of the piston 32 has extended the biasing element 48 so as to generate a second biasing force on the piston 32 acting in the direction 49. The pressure of the accumulated biasing fluid within the cylinder 34 is limited by leakage through the vent 38 so that excessive pressure buildup within the cylinder 34 is avoided.

So long as liquid flow F continues within the conduit C the constituent elements of the apparatus 10 remain in the positions substantially as illustrated in FIG. 1A.

If, however, liquid flow F is interrupted for any reason, including movement of the truck while the operator "rides the ticket", it may be appreciated that the motive force applied to the pump actuator 54 from the meter M will cease. In this event, the introduction of biasing fluid into the cylinder 34 terminates. Termination of the introduction of biasing fluid to the cylinder 34 is substantially contemporaneous with the interruption of liquid flow F in the conduit C and may therefore be construed as an event or signal to the timer 30 to begin timing the duration of the interruption.

The timer 30 (shown in FIG. 1) is arranged such that when the introduction of biasing fluid terminates the biasing force 35 diminishes and the biasing force 49 generated by the biasing element 48 becomes dominant. The biasing force 49 moves the piston 32 from its arming position (shown in FIG. 1A) toward the inlet end of the cylinder 34. The accumulation of biasing fluid within the cylinder 34 is vented in a controlled manner by leakage around the piston-cylinder interface. The piston and cylinder are sized such that movement of the piston 32 from the arming position toward the first position requires a time equal to the predetermined timing interval. A timing interval of two to three minutes is typical.

As shown in FIG. 1B, with the continued leakage of biasing fluid from the cylinder 34 the piston 32 is moved in response to the biasing force 49 such that pivotal motion of the linkage 40 causes the sear finger 46 to engage beneath and displace the spring arm 22 in the direction 60 (shown in FIG. 1B).

As seen in FIG. 1C, continued movement of the piston 32 toward the inlet end 34I of the cylinder 34 moves the sear finger 46 from engagement with the end of the spring arm 22 and permits the arm 22 to respond to the force generated by the elastic deformation thereof such that the arm 22 moves in the direction 62 and brings the spring hammer 24 into abrupt and jarring contact with the distal end of the arm A. The contact between the spring hammer 24 and distal ("anvil") end of the arm A displaces the arm A in the direction 64 and thereby causes the arm A to pivot and unlatch the tang $T_1$. The wheel W rotates slightly in the direction 66 so that when the arm A is reseated, the latch L does not engageably register with the tang $T_1$. In this manner it may be appreciated that any interruption in the flow F of liquid from the reservoir which exceeds the predetermined time interval (as measured by the timer 30) primes the sequence wheel W. When flow F resumes, the motion of the meter M is transmitted by the shaft S to the gear G and the disc $D_s$ until movement of the wheel W engages the tang $T_2$ with the latch. The disc $D_s$ is advanced, thus incrementing the sale sequence number substantially as discussed in connection with normal (legal) operation. The non-sequential sale sequence number will thus indicate an extended interruption in liquid flow.

Of course, if the interruption in liquid flow F is less than the predetermined time interval and liquid flow is reinstituted prior to the timing out of the timer 30, it will be appreciated that reciprocation of the pump actuator 52 will cause reintroduction and reaccumulation of biasing fluid within the cylinder 34 so that the biasing force 49 of the biasing element 48 may be overcome before the spring arm 22 is triggered. In this event, the arm A will not be pivoted out of latched engagement with the tang $T_1$.

If the arm A has been lifted as discussed above, and the driver "rides the ticket," at the cessation of the flow, the sale sequence number—now incremented by two units (one at start of flow, a second at re-start of flow after interruption)—is not sequential with the previous sale sequence number. Thus, the occurrence of a flow interruption for a time greater than the reference time interval will be indicated.

It is noted that at the start of the next delivery the piston 32 is displaced from the first position shown in FIG. 1C to the second, arming, position shown in FIG. 1A. Although the sear finger 46 is then returned to its position beneath the spring hammer 22, the movement of the sear finger 46 does not impart a force to the hammer 22 sufficient to drive it into contact with the "anvil" end of the arm A.

The highly stylized pictorial representations shown in FIG. 1 are meant to convey to those skilled in the art the structure and principles of operation of a liquid flow monitoring device in accordance with this invention. It may be appreciated that the monitoring apparatus 10 in accordance with this invention requires no interconnection to an external source of biasing fluid or with any of the delivery vehicle's subsystems. The apparatus 10 is enclosed within the Veeder-Root Counter-Printer V and is responsive only to the flow of liquid through the meter M.

Figure 2:
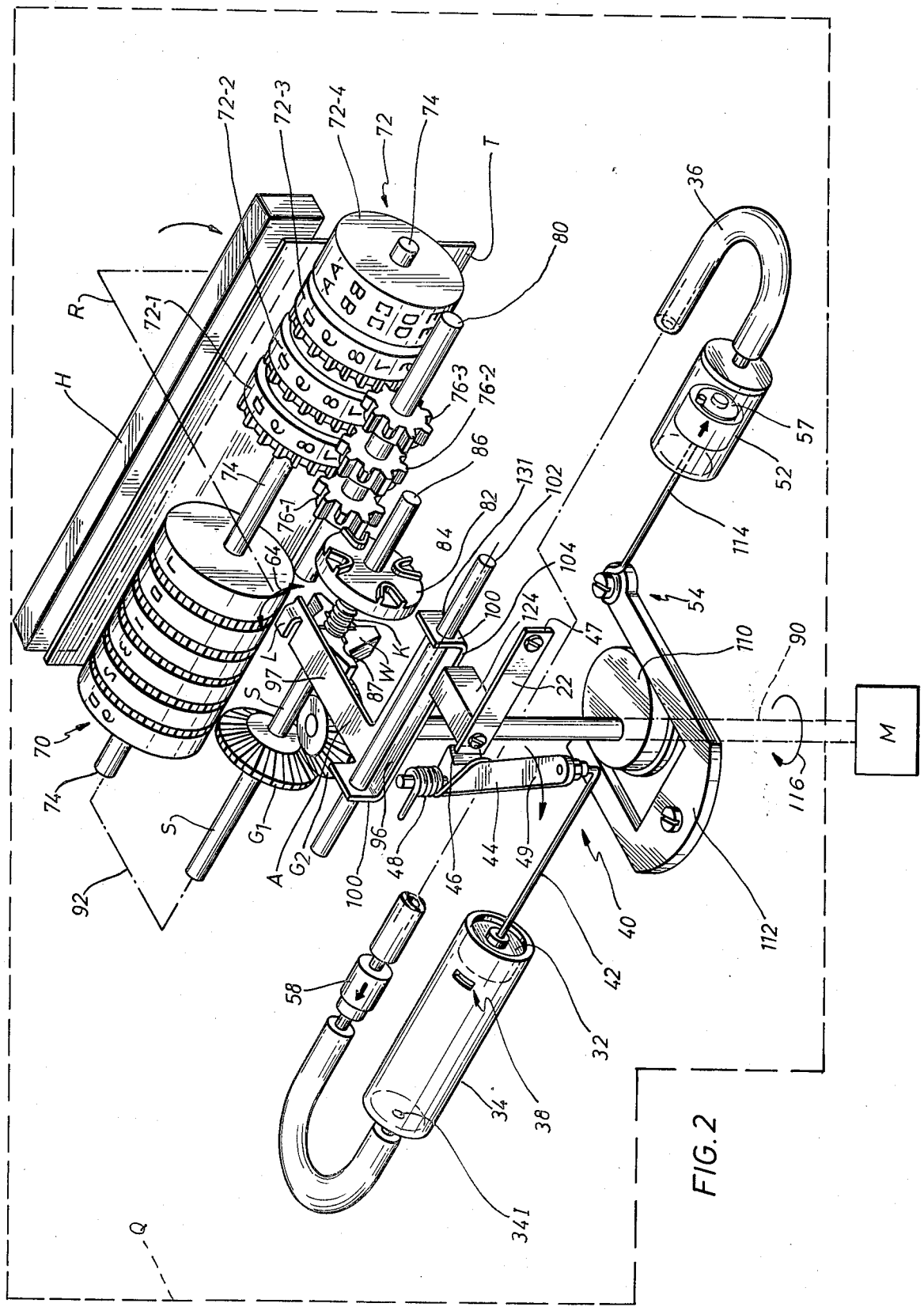
FIG. 2 is a more detailed perspective view of the invention shown in connection with a portion of a Veeder-Root Counter-Printer Assembly.

With reference now to FIG. 2, the monitoring apparatus 10 in accordance with this invention is illustrated in perspective with a more detailed view of the Veeder-Root Counter-Printer V. Like reference characters refer to corresponding elements of the invention discussed in connection with FIG. 1.

As seen in FIG. 2, the monitoring apparatus 10 is adapted for utilization with and complete mounting within the casing Q of the Veeder-Root Counter-Printer V. The Veeder-Root Counter-Printer V may be that manufactured and sold under Form No. 789001-017 by Veeder-Root Corporation of Hartford, Connecticut. The Veeder-Root Counter-Printer V includes an array of discs D having gallonage discs 70 and sale sequence discs 72 (one of which corresponds to the disc $D_s$ in FIG. 1). The discs 70 and 72 are each freely rotatably mounted about a common shaft 74. The disc 72-1 defines the units digit of the sale sequence number, the disc 72-2 defines the tens digit, while the disc 72-3 defines the hundreds digit of the sale sequence number. A manually adjustable truck identity disc 72-4 is also provided. A gear 76-1 through 76-3 is respectively connected to each sale sequence disc 72. The gears 76 are each engageable by driver gears 78 mounted on a shaft 80 to define a conventional geneva movement mechanism.

The teeth of the geneva movement driver gear 78-1 are engaged by a sprocket wheel 82 having cut out portions 84 therein. The sprocket wheel 82 is mounted on a shaft 86 one end of which is engaged by the wire clutch K.

The other end of the wire clutch K is received within a recess 87 defined adjacent the central bore of the sequence wheel W. The sequence wheel W is mounted on the shaft S, the end of the shaft S being received within the wire clutch K so that rotation of the shaft S may be transmitted to the sprocket wheel shaft 86 and thence to the sale sequence discs 72. (This structure corresponds to the connector arrangement X between the clutch K and the disc $D_s$ in FIG. 1.

A driven bevel gear $G_1$ is mounted to the shaft S and is matedly engaged with a driver bevel gear $G_2$. The driver bevel gear is connected by a shaft 90 to the output shaft of the meter M, as schematically shown in FIG. 1.

The shaft S is also connected through a geneva mechanism 92 (similar to the above-defined arrangement and thus shown schematically in FIG. 2) to the gallonage discs 70 mounted for rotation about the shaft 74. When the shaft 90 is driven by the meter M in response to the passage of flow F therethrough, it may be readily appreciated that the gallonage discs 70 rotate to present the appropriate gallonage numbers for imprinting on the ticket by the hammer H.

The hammer H is connected through the connecting rod R to the end of the pivotal arm A having the latch or detent L therein to thereby pivotally displace the end of the arm A in the direction 64 as shown in FIGS. 1 and 2. As discussed above, pivotal movement of the arm A has the effect of releasing the tang T of the wheel W theretofore engaged by the latch L so that a slight rotative movement of the wheel W may occur. A slight movement by the wheel W, in response to the bias imposed thereon by the wire clutch K, will have the effect of placing the tang T theretofore engaged by the latch L out of registration therewith.

The arm A takes the form of a substantially "L-shaped" bracket having a base 96 integrally disposed with a planar portion 97. The base 96 is bent upwardly at its ends, as at 100, to receive a pivot rod 102 therethrough. It may be seen from FIG. 2 that since the forward surface 104 of the base is below the axis of the pivot rod 102, application of a force at the surface 104 will generate pivotal movement of the arm A to move the latch L in the direction 64 to generate the consequences outlined above.

The monitoring apparatus 10 in accordance with the embodiment of the invention as shown in FIG. 2 is arranged such that interruption of flow (measured by the timer 30) for a time greater than a predetermined time interval will cause the arm A to be lifted in the direction 64 to thus release the sequence wheel W and prime the sale sequence discs 72 (which include the disc $D_s$) for advancement to the next sale sequence number when flow is restarted. If flow is restarted while the same ticket is in the printer V, the indicia of flow interruption will take the form of non-sequential sale numbers.

The actuator 20 as shown in FIG. 2 includes the resilient spring arm 22 mounted to the Veeder-Root housing Q (as suggested at reference character 47). The spring arm 42 has the spring hammer 24 disposed thereon arranged to strike the exposed forward surface 104 of the arm A when it is desired to lift the latch L and to prime the incrementing of the sale sequence number.

The timer 30 shown in FIG. 2 is a fluidic timer which takes the form of a pneumatic piston 32 movably disposed within the cylinder 34. Piston cylinder arrangements manufactured by Airpot Corporation, Norwalk, Connecticut and sold under Model No. 160 may be used for both the piston-cylinders 32-34 and 52. Alternatively, the timer piston-cylinder (32-34) may utilize a rolling diaphragm to provide a virtually frictionless piston-cylinder. A needle valve may provide the leaking tolerance and a pressure relief valve may provide the vent. The vent port 38 is also seen in FIG. 2. The linkage 40 includes the arm 42 pivotally connected to the spring hammer sear 44 having the sear finger 46 thereon. Biasing element 48 takes the form of a wrapped coil spring as shown in FIG. 2.

The timer initiating arrangement 50 includes the reciprocating pump 52 connected by the hose 36 to the inlet end 34I of the cylinder 34. The check valve 58 is disposed within the line 36. The pump piston includes the check valve 57 mounted to permit fluid flow into the pump 52 during the suction stroke thereof, yet, prevent leaking therefrom during the compression stroke so that pressurized fluid is introduced into the line 36. A suitable check valve 58 is that manufactured by Pall Biomedical Products Corporation, Glencove, New York, and sold under Model No. AB-8916-ZP, although it is understood that any suitable check valve may be utilized. Of course, the purpose of the check valve 58 is to prevent back flow of biasing fluid from the cylinder 34.

The pump actuator 54 in FIG. 2 takes the form of a cam 110 eccentrically mounted on the meter output shaft 90. A cam follower 112 is disposed in operative association with the cam 110 and is connected by a linkage arm 114 to thereby reciprocate the piston of the pump 52.

In operation, once a ticket is inserted into the Veeder-Root Counter-Printer V, the previous sale sequence number (and the previous gallonage if desired) are imprinted on the ticket. Since the sale sequence number has previously been primed for incrementation, the start of flow rotates the meter shaft 90, which rotation is geared into the shaft S. The sequence wheel W, the theretofore engaged tang having been released at the termination of the previous transaction, rotates angularly to engage the next-successive tang thereof in the latch L. The rotation of the wheel W at the end of the previous delivery engaged the wire clutch K. The rotation of the meter shaft S is transmitted by the clutch K to the sprocket wheel 82. The sprocket wheel 82 is connected to the geneva movement 76-78 to thereby rotate the appropriate discs 72 (including the disc $D_s$) until the sequence wheel W again causes the clutch K to become disengaged. The sale sequence number is thus incremented. The specific embodiment of the invention shown in FIG. 2 responds to liquid flow through the meter by rotation of the eccentric cam 110 (connected to the shaft 90) in the direction 116. Rotation of the cam 110 and the action of the cam follower 112 and the linkage 114 reciprocates the pump 52 to pressurize the piston-cylinder arrangement (through the double check valves 57 and 58). The piston 52 is sized such that approximately one revolution of the cam 110 is necessary to pressurize the cylinder 34. Pressurization of the cylinder moves the piston 32 and, through the linkage 40, disposes the sear finger 46 in the armed position beneath the spring arm 22.

An interruption in liquid flow will, as discussed above, terminate reciprocation of the pump and terminate the introduction of biasing fluid into the cylinder 34. As the piston displaces within the cylinder 34 in response to the biasing force 49 imposed by the spring 48, the spring arm 22 is resiliently bent by the sear finger 46 away from the surface 104 of the arm A. If the movement of the piston 32 into the cylinder continues, the spring hammer 24 is released and strikes against the anvil surface 104. The tolerances of the piston-cylinder are sized to provide any predetermined time interval, most typically two to three minutes.

Jarring contact between the spring hammer 24 and the surface 104 of the arm A causes the latch L to pivot about in the direction 64 thereby lifting the latch L out of engagement with the then-engaged tang of the sequence wheel W. The sale sequence number is again primed for incrementation as the flow resumes. If the flow is resumed before the driver removes the ticket, the sale sequence number is again incremented (thus increasing the number by two digits over the previous sale sequence number). When the ticket is eventually printed out, non-sequential sale sequence numbers will appear on the ticket. It will be recalled from the example given above that when an authorized delivery has occurred the sale sequence number increments from an initial sale number (a "6") to a final sale number (a "7"). However, if an unauthorized delivery has occurred the final sale number is non-sequential. That is, the final sale number will appear as an "8". In this it will therefore be readily apparent (1) that a flow interruption of a duration greater than the reference time interval has occurred and (2) that flow was thereafter resumed before the ticket was removed.

As noted above, the monitoring apparatus 10 is disposed within and totally enclosed by the housing Q of the Veeder-Root Counter-Printer Assembly. The monitoring apparatus 10 is thus totally "self-contained" in the sense that it derives the power for operation from the meter input shaft and it is not interconnected with any vehicle subsystem. Further, the monitoring apparatus 10 is itself disposed in a suitable frame (not shown) and is readily sealed within the casing Q and thus inaccessible to tampering. It is noted that when installing the monitoring apparatus 10 into the above-described interrelationship with the Veeder-Root Counter-Printer care must be exercised to ensure that the spring hammer 24 is not so closely disposed to the anvil surface 104 (FIG. 2) that the printer is armed or primed when the sear finger 46 returns to its position (shown in FIG. 2) beneath the spring hammer 22.

Figure 3A:
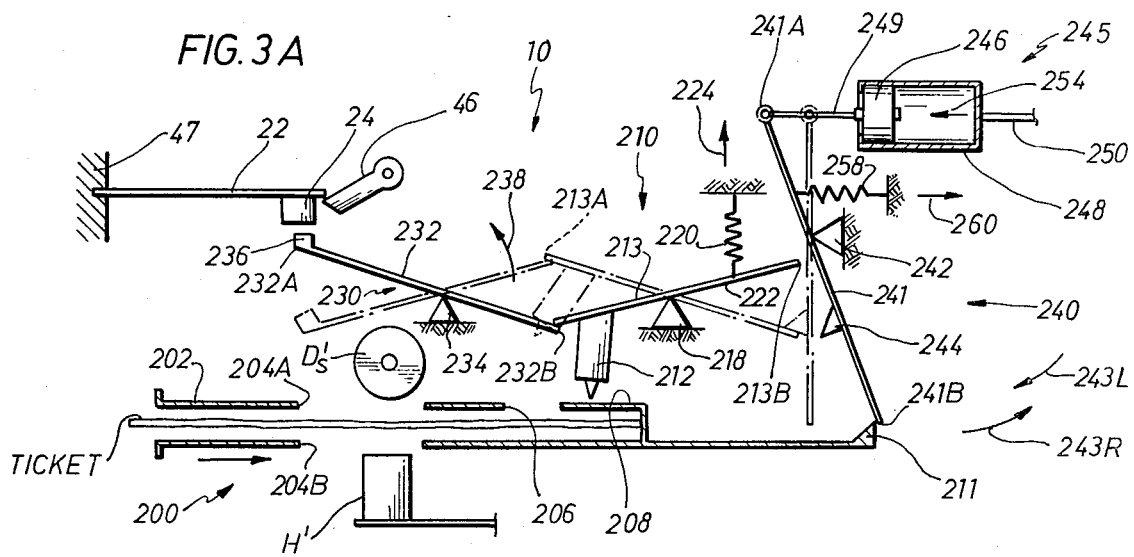
FIGS. 3A through 3C are highly stylized pictorial representation of an apparatus in accordance with this invention interconnected with a generalized counter-printer and which schematically illustrate the various positions occupied by the elements of the invention during the operation thereof.
Figure 3B:
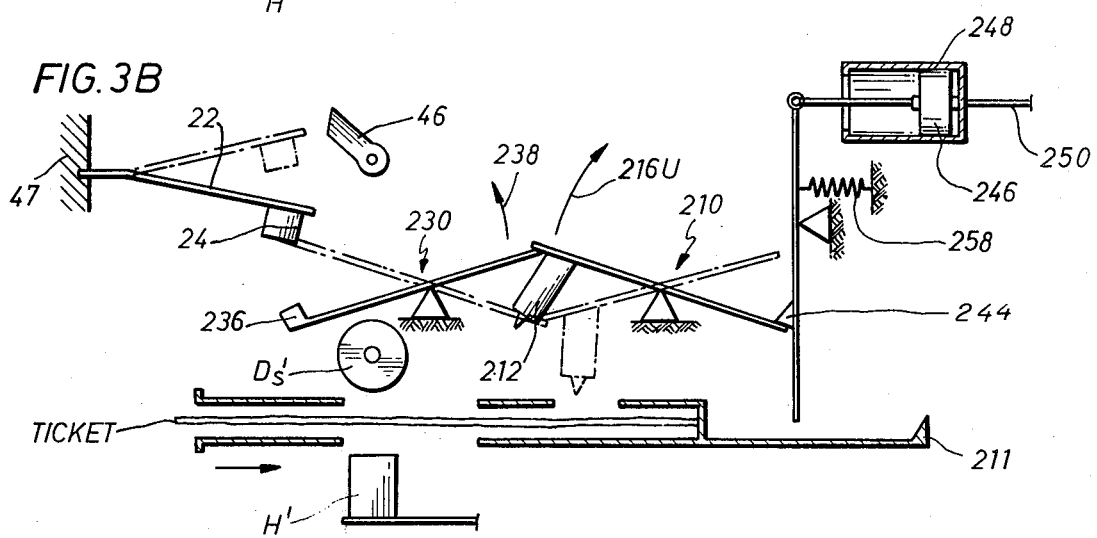
Figure 3C:
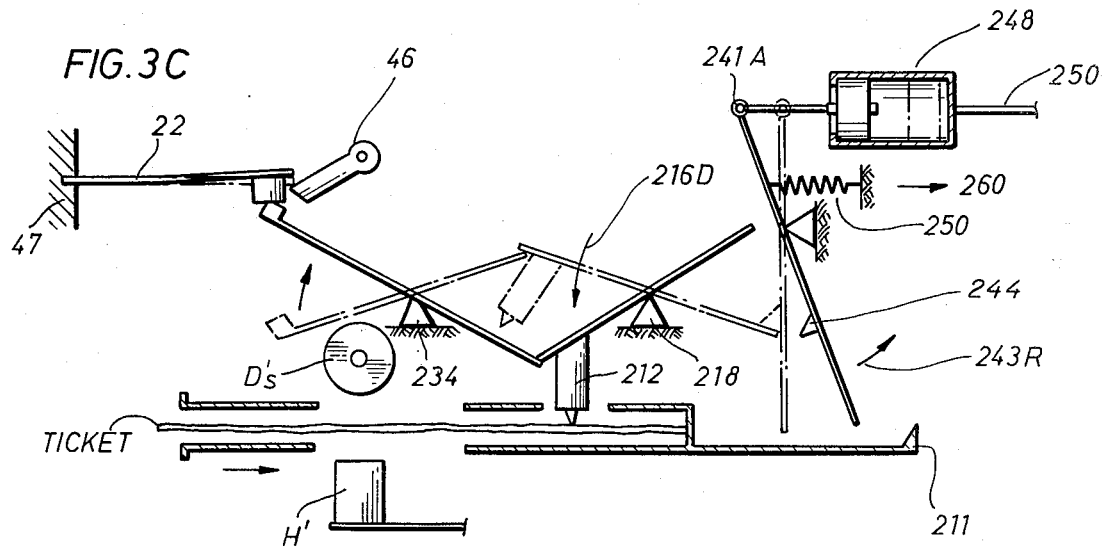

Referring now to FIGS. 3A through 3C, a highly stylized pictorial representation of an alternate embodiment of the monitoring apparatus 10 in accordance with the invention is shown in cooperative association with a generalized counter-printer arrangement indicated by reference character 200. For clarity and economy of illustration, the entirety of the monitoring apparatus 10 has not been reproduced in FIG. 3. Only those portions of the previously described embodiment of the monitoring apparatus 10 as the spring arm 22, the spring hammer 24 and the sear finger 46, which are necessary to illustrate operation of the embodiment shown in FIG. 3 and the interaction thereof with the counter-printer 200 are shown. It is to be understood, however, that the remaining elements of the monitoring apparatus 10, including the actuator arrangement 20, the flow responsive timer 30, and the timer initiating signal generator 50, form a part of the embodiment of the invention shown in FIG. 3 and cooperate with the other elements of the embodiment of the monitoring apparatus 10 shown in FIG. 3 in a manner to be described herein to cause to be printed on a ticket insertable into the counter-printer an indicia representative of the occurrence of both (1) an interruption in liquid flow after the ticket has been inserted into the counter-printer for a time duration greater than the reference time interval and (2) the resumption of flow before the ticket is removed therefrom. The reference time interval is the time required for the biasing fluid accumulated within the cylinder 32 to drain therefrom and thus diminish the biasing force imposed thereby to a level such that the printer is armed or primed to generate an indicia upon the resumption of flow. Those portions of the monitoring apparatus 10 which are not illustrated in FIG. 3 are to be understood to operate in the manner described in connection with FIGS. 1 and 2.

In FIG. 3, the counter-printer 200 includes a tray 202 or other suitable receptacle in which the ticket to be used to record a transaction with a customer is disposed. The tray 200 includes a set of opposed windows 204A and 204B and a single window 206. The ticket may be marked by the action of a rubberized hammer H' striking the ticket through the window 204A to bring the ticket into contact with an array of disks D' (which may include a sale sequence number disk Ds' ) through the window 204B. A portion 208 of the tray 202 will be referred to as a "blank area" and serves a purpose to be discussed herein. The tray also includes an abutment foot 211.

The embodiment of the monitoring apparatus 10 shown in FIG. 3 includes a printer arrangement 210 movable (through the action of a printer arming arrangement 230) from a printing or disarmed position (shown in solid lines in FIG. 3B) to an armed position (shown in solid lines in FIG. 3A) in response to an interruption in flow F for a time greater than a reference time interval (as monitored by the timer 30 in the manner discussed in connection with FIGS. 1 and 2). The printer arrangement 210 is also movable (through the action of a printer releasing arrangement 240 also responsive to flow) from the armed to the printing position if flow is resumed after the occurrence of an interruption greater than the reference time interval but before the ticket is removed from the counter-printer 200.

The printer arrangement 210 includes a printer element 212 secured to a printer lever 213 adjacent a first end 213A thereof. The lever 213 is mounted for movement in reciprocating direction 216U and 216D about a fulcrum 218. The printer lever 213 is connected to a biasing element, as a spring 220, at a connection point 222 adjacent the second end 213B thereof. The biasing element 220 exerts a force on the printer lever 213 in a direction 224 tending to move the printer lever 213 in the direction 216D toward the printing, or disarmed, position shown in FIG. 3B.

The printer arming arrangement 230 includes a lever 232 pivotally mounted at a fulcrum 234. The lever 232 includes an anvil 236 adjacent the first end 232A thereof. The anvil 236, when struck by the spring hammer 24 (released through movement of the sear finger 46 when the timer 30 times out in the manner discussed in FIGS. 1 and 2) causes the lever 232 to pivot in the direction 238 and to engage (at its second end 232B) with the end 213A of th printer lever 213. This action lifts the printer lever 213 in the direction 216U to the armed position (FIG. 3A). Thus, the printer priming arrangement 230 is responsive to an interruption in flow in excess of a predetermined time interval to move the printer arrangement to the armed position.

The printer holding and releasing arrangement 240 is adapted to releasably hold the printer lever 213 in the armed position. The response to a resumption in liquid flow occurring after a flow interruption exceeding the predetermined referenced time, but before the ticket is removed, the arrangement 240 releases the printer lever 213 to permit it to respond to the biasing force acting in the direction 224 to move the printer 212 in the direction 216D. The printer 212 is thus caused to strike the ticket through the window 206 and to thereby print an indicia thereon.

The arrangement 240 includes a lever arm 241 mounted for pivotal movement about fulcrum point 242 in reciprocating directions 243L and 243R. The lever arm 241 includes a sear 244 disposed thereon so as to engage the printer lever 213 adjacent its second end 213B. The sear 244, when engaged with the printer lever 213, holds the printer lever 213 and therefore, the printer 212 in the armed position shown in FIG. 3A.

The arrangement 240 is responsive to the resumption of flow through a flow-responsive element 245, shown in FIG. 3 in the form of a piston 246 movably disposed within a cylinder 248. The piston 246 includes a pistion rod 249 which is connected to the first end 241A of the lever 241. The cylinder 248 is connected through a suitable connection 250 to the timer interruption signal generator 50. In the form of the invention shown in FIG. 3, the connection 250 takes the form of a hose disposed in fluid communication with the hose 36 at a point intermediate the check valve 58 and the inlet end 34I of the cylinder 34. Of course, any suitable connection may be used whereby the element 245 is rendered responsive to the flow F in the conduit C. It may therefore be seen that actuation of the reciprocating pump 52 in response to the resumption of liquid flow pressurizes the cylinder 248 to displace the piston 246 in the direction 254. Displacement of the piston 246 within the cylinder 248 in the direction 254 causes movement of the sear 244 in the direction 243R to thereby release the printer lever 213B. A biasing element 258, such as a coil spring, exerts a bising force in a direction 260 opposing the force acting in the direction 254 and tending to displace the sear 244 in the direction 243L. As is explained thereafter, the arm 241 is also movable in the direction 243R by the abutment of the foot 211 with the second end 241B thereof.

In operation, at the end of any given delivery the counter-printer 200 and the elements of the monitoring apparatus 10 occupy the positions shown in FIG. 3A. That is to say, the sear 244 is engaged with the end 213B of the printer lever 213 thereby holding the printer 212 in the first, or armed, position. The spring hammer 22 is shown in the position corresponding to that occupied in FIG. 1A, with the sear finger 46 also occupying the position there shown.

When the driver inserts a ticket into the ticket tray 202 and cranks that tray into the counter-printer 200 abutting contact between the foot 211 and the end 241B of the arm 241 occurs. The abutting action between the foot 210 and the end 241B displaces the arm 241 in the direction 243R to thereby release the sear 244 and disarm the printer. The printer lever 213 responds to the bias of the spring 220 and displaces in the direction 216D to move the printer 212 toward its printing position. However, since the window 206 has not as yet been brought into registration with the printer 212, the impact of the printer falls on the blank area 208 so that no indicia is recorded upon the ticket. (Of course, in the absence of a tray 202 any arrangement whereby the printer 212 is released upon insertion of the ticket lies within the contemplation of this invention. Alternatively, the printer may be permitted to imprint an indicia on some portion of the ticket which is marked as an acceptable location for such an indicia to appear.

With the ticket completely in position within the counter-printer 200 and with the printer lever 213 occupying the disarmed, or printing, position (as shown in FIG. 3B) liquid flow is initiated.

As flow begins, the reciprocating pump 52 pressurizes the cylinder 34 moving the sear finger 46 beneath the spring hammer 22 in the manner discussed in connection with FIG. 1. Motion of the pump 52 is also appreciated to pressurize the cylinder 248 thereby displacing the piston 246 and moving the sear 244 in the direction 243R. However, since the printer is disarmed, this is a "phantom" motion.

If flow is interrupted, the timer 30 times out, as discussed above, releasing the sear finger 46 and causing the hammer 24 to impact upon the anviil 236. The impact will the anvil 236 pivots the lever 232 in the printer arming arrangement 230 in the direction 238. When the sear finger 46 is released, the sear 244 is positioned to hold the end 213B of the printer lever 213 and thereby dispose the printer 212 in the armed position (FIG. 3B).

If flow resumes before the ticket is removed, the cylinder 248 is re-pressurized allowing the piston 246 to displace with respect thereto and to move the sear 244 in the direction 243R. The printer lever 213 is again released, and the printer 212 responds to the bias of the spring 220 by moving in the direction 216D and strikes the ticket through the window 206. In this manner, an indicia is printed on the ticket representative of the occurrence of both (1) an interruption in liquid flow for a time period in excess of the predetermined time interval and (2) the resumption of liquid flow before the removal of the ticket.

Of course, at the termination of the resumed flow, the anvil 236 is again struck and the printer 212 is again displaced to the armed position. However, if the ticket is removed at this time the printer remains in the armed position. The insertion of the ticket at the next delivery location will trip the printer as discussed above.

In view of the foregoing, it may therefore be appreciated that an apparatus is provided whereby an indicia (as non-sequential sale sequence numbers) indicates to an observer that an interruption in liquid flow greater than a predetermined time interval has occurred and that flow has been thereafter resumed before the ticket is removed. In this manner it is believed that unauthorized dispensation of liquid petroleum products, as is the case when the driver "rides the ticket" may be readily detected and thereby prevented.

Those skilled in the art in view of the foregoing description of the operating principles and preferred embodiment of the invention may effect numerous modifications thereto. It is understood, however, that these modifications lie within the contemplation of this invention and are to be encompassed within the scope of the appended claims.

What is claimed is:

1. Apparatus for monitoring the flow of a fluid from a reservoir by generating a predetermined indicia on a ticket, the apparatus comprising:
    means for generating on the ticket an indicia representative of the occurrence of both an interruption of a predetermined duration in the flow of fluid from the reservoir followed by a resumption of fluid flow before the ticket is removed; and
    a timer arrangement operatively associated with the indicia generating means and responsive to the flow of fluid for timing the duration of an interruption thereof and for priming the indicia generating means if the duration of the interruption exceeds the predetermined time interval.

2. Apparatus for monitoring the flow of a fluid from a reservoir by printing a predetermined indicia on a ticket, the apparatus comprising:
    a printer arrangement for printing on the ticket an indicia representative of the occurrence of both an interruption of a predetermined duration in the flow of fluid from the reservoir followed by a resumption of fluid flow before the ticket is removed; and a timer arrangement responsive to the flow of fluid for timing the duration of an interruption thereof and for priming the printer if the duration of the interruption exceeds the predetermined time interval.

3. Apparatus according to claim 2 wherein the timer arrangement comprises:

a fluidic piston-cylinder arrangement responsive to fluid so that the piston is movable within the cylinder from a first to a second, priming, position in response to a biasing force exerted thereagainst upon the initiation of flow and for the duration of flow; and a biasing element adapted to displace the piston from a second to the first position in a reference time interval defined by the time needed for the biasing force to diminish such that the piston, upon reaching the second position, actuates the printer to generate an indicia on the ticket.

4. Apparatus according to claim 3, wherein the fluidic piston-cylinder is a pneumatic piston-cylinder.

5. Apparatus in accordance with claim 2 further comprising:

a printer arming arrangement operatively associated with the timer for arming the printer arrangement if the duration of the interruption exceeds the predetermined time interval.

6. Apparatus in accordance with claim 3 further comprising:

a printer holding arrangement responsive to the flow of fluid for releasably holding the printer arrangement in the primed position and for releasing the same if flow is resumed after the printer is primed but before the ticket is withdrawn.

7. Apparatus according to claim 6 wherein the timer arrangement comprises:

a fluidic piston-cylinder arrangement responsive to fluid flow so that the piston is movable within the cylinder from a first to a second, priming, position in response to a biasing force exerted thereagainst upon initiation of flow and for the duration of flow; and, a biasing element adapted to displace the piston from the second to the first position in a reference time interval defined by the time needed for the biasing force to diminish such that the piston, upon reaching the second position, actuates the printer arming arrangement to arm the printer arrangement.

8. Apparatus according to claim 7 wherein the printer holding arrangement comprises:

a fluidic piston-cylinder responsive to fluid flow to hold the printer arrangement in the armed position after an occurrence of a flow interruption of a duration greater than the predetermined time interval and, in response to a resumption in fluid flow before the ticket is withdrawn, to release the printer arrangement to generate an indicia on the ticket.

9. Apparatus according to claim 7, wherein the fluidic piston cylinder is a pneumatic piston-cylinder.

10. In a liquid delivery system for monitoring the flow of liquid product from a reservoir of the type having a disc having a sale sequence number thereon, the disc being incrementable at a time during the dispensation of the liquid product;

the improvement comprising:

an actuator associated with the disc to increment the sale sequence number if there occurs both an interruption of a predetermined duration in the flow of liquid from the reservoir followed by a resumption in liquid flow before the ticket is removed; and a timer responsive to the flow of liquid for timing the duration of an interruption of the flow, the timer being operatively associated with the actuator to enable operation thereof if the duration of the interruption exceeds a predetermined time interval.

11. The liquid delivery system of claim 10 further comprising:

means operatively associated with the timer and operable by the flow of liquid for transmitting an initiating signal to the timer upon the occurence of an interruption in liquid flow.

12. The liquid delivery system of claim 10 wherein the timer comprises:

a pneumatic piston having a linkage connected thereto movable within a cylinder in response to the introduction of a biasing fluid in the cylinder from a first to a second, priming, position; and a biasing element adapted to displace the piston within the cylinder from the second to the first position in a predetermined time interval when the introduction of biasing fluid is interrupted to move the linkage into operative contact with the actuator at the termination of the interval.

* * * * *

UNITED STATES PATENT AND TRADEMARK OFFICE
CERTIFICATE OF CORRECTION

PATENT NO. : 4,241,354

DATED : December 23, 1980

INVENTOR(S) : Christopher B. Laird

It is certified that error appears in the above-identified patent and that said Letters Patent are hereby corrected as shown below:

In The Specification

Col. 1, line 28 - "dispersion" should read -- dispensation --.

Col. 1, line 41 "consumer" should read -- customer --.

Col. 3, line 12 "vehicle's" should read -- vehicles' --.

Col. 4, line 64 - "representation" should read -- representations --.

Col. 5, line 7 - "in" should read -- is --.

Col. 5, line 46 - "K", second occurrence, should read -- X --.

Col. 7, line 48 - "scale" should read -- sale --.

Col. 9, line 62 - after "event," insert -- of course --.

Col. 12, line 5 - "stroke" should read -- stoke --.

Col. 14, line 57 - "The" should read -- In --.

Col. 16, line 7 - "anviil" should read -- anvil --.

UNITED STATES PATENT AND TRADEMARK OFFICE
CERTIFICATE OF CORRECTION

PATENT NO. : 4,241,354

DATED : December 23, 1980

INVENTOR(S) : Christopher B. Laird

It is certified that error appears in the above—identified patent and that said Letters Patent are hereby corrected as shown below:

In The Claims

Col. 18, line 36 - "occurence" should read -- occurrence --.

Signed and Sealed this

Ninth Day of June 1981

[SEAL]

Attest:

RENE D. TEGTMEYER

Attesting Officer     Acting Commissioner of Patents and Trademarks